United States Patent
Scheer

(10) Patent No.: US 11,771,099 B2
(45) Date of Patent: Oct. 3, 2023

(54) SMOKING APPARATUS AND METHODS

(71) Applicant: Tim Scheer, Washington, MO (US)

(72) Inventor: Tim Scheer, Washington, MO (US)

(73) Assignee: Blues Hog LLC, Washington, MO (US)

(*) Notice: Subject to any disclaimer, the term of this patent is extended or adjusted under 35 U.S.C. 154(b) by 768 days.

(21) Appl. No.: 16/452,130

(22) Filed: Jun. 25, 2019

(65) Prior Publication Data

US 2019/0387759 A1   Dec. 26, 2019

Related U.S. Application Data

(60) Provisional application No. 62/689,739, filed on Jun. 25, 2018.

(51) Int. Cl.
*A23B 4/052* (2006.01)

(52) U.S. Cl.
CPC ........ *A23B 4/0523* (2013.01); *A23V 2002/00* (2013.01)

(58) Field of Classification Search
CPC ..... A23B 4/0044; A23B 4/056; A23B 4/0523; A47J 36/38; A47J 37/06; Y02B 30/70; A23V 2002/00
USPC ......... 99/331, 357, 445, 468, 481, 482, 474; 426/314, 523
See application file for complete search history.

(56) References Cited

U.S. PATENT DOCUMENTS

| | | | | |
|---|---|---|---|---|
| 3,962,962 A * | 6/1976 | Anderson | ........... | A47J 36/2483 219/400 |
| 4,014,312 A * | 3/1977 | McKelvey | ........... | F24C 15/04 126/200 |
| 4,979,436 A * | 12/1990 | McGowan | ........... | A23B 4/052 126/369 |
| 5,195,423 A * | 3/1993 | Beller | ........... | A47J 37/0704 99/450 |
| 6,038,964 A * | 3/2000 | Sikes | ........... | A47J 37/0704 99/473 |
| 6,342,262 B1 * | 1/2002 | Wuest | ........... | F24C 15/327 99/476 |
| D491,410 S * | 6/2004 | Saunders | ........... | D7/334 |
| 6,820,538 B2 * | 11/2004 | Roescher | ........... | A23L 5/17 99/450 |
| 7,060,940 B2 * | 6/2006 | Kim | ........... | H05B 6/642 219/400 |
| 7,348,522 B1 * | 3/2008 | Criscuolo | ........... | F25D 25/028 219/487 |
| 7,368,684 B2 * | 5/2008 | Kim | ........... | F24C 15/2007 219/400 |
| 7,547,862 B2 * | 6/2009 | Kim | ........... | F24C 15/04 219/400 |

(Continued)

OTHER PUBLICATIONS

Gateway Drum Smokers; available at https://www.gatewaydrumsmokers.com/; last visited Jun. 25, 2019.

*Primary Examiner* — Jimmy Chou
(74) *Attorney, Agent, or Firm* — Armstrong Teasdale LLP

(57) ABSTRACT

A smoker assembly includes a body portion comprising a body top end and a body bottom end. The body portion includes at least one air inlet vent defined therethrough proximate the body top end. The smoker assembly also includes at least one air inlet duct coupled to the body portion. The air inlet duct includes a first opening configured to align with the air inlet vent and a second opening configured to be positioned proximate the body portion bottom end.

16 Claims, 5 Drawing Sheets

(56) References Cited

U.S. PATENT DOCUMENTS

| | | | | |
|---|---|---|---|---|
| 7,681,493 B2* | 3/2010 | Moore | A23B 4/052 | 99/481 |
| 7,686,009 B2* | 3/2010 | Park | F24C 15/006 | 126/200 |
| 7,708,007 B2* | 5/2010 | Kim | F24C 15/006 | 126/193 |
| 7,709,769 B2* | 5/2010 | Ando | F24C 7/06 | 219/401 |
| 7,759,615 B2* | 7/2010 | Ando | A21B 3/04 | 219/400 |
| 7,856,973 B2* | 12/2010 | Kim | H05B 6/642 | 126/193 |
| 7,984,709 B1* | 7/2011 | Byrnes | A47J 37/0704 | 126/250 |
| 8,028,619 B2* | 10/2011 | Lee | F24C 15/04 | 126/193 |
| 8,042,458 B2* | 10/2011 | Ueda | A21B 3/04 | 219/400 |
| 8,042,532 B2* | 10/2011 | Kaneko | F24C 15/02 | 219/400 |
| 8,122,818 B2* | 2/2012 | Oberlander | A23B 4/044 | 99/481 |
| 8,288,690 B2* | 10/2012 | Boubeddi | F24C 15/327 | 392/394 |
| 8,850,968 B2* | 10/2014 | Seguchi | F22B 1/284 | 126/369 |
| 8,851,063 B1 | 10/2014 | Degraff et al. | | |
| 9,027,470 B1* | 5/2015 | Magner | A47J 36/24 | 99/474 |
| 2003/0150336 A1* | 8/2003 | Roescher | A23L 5/17 | 99/482 |
| 2004/0139958 A1* | 7/2004 | Werz | A21B 1/28 | 126/21 R |
| 2006/0219234 A1* | 10/2006 | Larsen | F24C 15/006 | 126/21 R |
| 2008/0184985 A1* | 8/2008 | Hasslberger | F24C 15/006 | 126/21 R |
| 2010/0252021 A1* | 10/2010 | Bryce | A47J 37/0786 | 126/1 R |
| 2011/0271949 A1* | 11/2011 | Ortner | A47J 37/0704 | 126/25 R |
| 2012/0266857 A1* | 10/2012 | Lin | A47J 36/12 | 126/25 R |
| 2012/0318255 A1* | 12/2012 | Brown | F23B 20/00 | 126/25 R |
| 2013/0112187 A1* | 5/2013 | Cedar | F24B 13/00 | 110/267 |
| 2014/0360387 A1* | 12/2014 | Bogdon | A23B 4/0523 | 99/476 |
| 2015/0068510 A1* | 3/2015 | Lee | F24C 15/006 | 126/193 |
| 2015/0079250 A1* | 3/2015 | Ahmed | A47J 37/0704 | 99/481 |
| 2016/0157658 A1* | 6/2016 | Cupp | F22B 1/28 | 99/330 |
| 2016/0183724 A1* | 6/2016 | Nadal | A47J 37/0763 | 126/25 R |

\* cited by examiner

SMOKING APPARATUS AND METHODS

CROSS-REFERENCE TO RELATED APPLICATIONS

This application is a non-provisional application of and claims priority to U.S. Provisional Patent Application Ser. No. 62/689,739, filed Jun. 25, 2018, which is hereby incorporated by reference in its entirety.

BACKGROUND

The subject matter described herein relates generally to the field of cooking, and more particularly to an apparatus and method for rapidly cooking and smoking meats and other smoked products.

The process of smoking meats dates to antiquity, and was originally a method of preserving meats prior to the ready availability of refrigeration and chemical preservatives. Now, smoking is commonly used to impart taste and texture to meats. Known smoking methods include enclosing raw meat to be smoked within a smoking chamber, and supplying the chamber with low, even, indirect heat over a long period of time to cook the meat, while also burning wood to produce wood smoke. The shape and design of the smoker is such that both heated air and wood smoke flow past and around the meat, gradually cooking it while particulate in the wood smoke infuses the meat with flavor.

Known smoking processes are commonly believed to require a long amount of time and are performed at relatively low temperatures. When meat is smoked in at least some known smokers at high temperature, the exterior of the meat may accumulate heat disproportionately to the interior. Because meat contains a substantial amount of trapped moisture (i.e., water), prolonged exposure to high heat may vaporize water content in the exterior portions, which will then vent out of at least some known smoker. When the heat is kept low (e.g., closer to the boiling point of water), less water content is lost, and the meat retains more of its texture and flavor. However, smoking at such relatively low temperatures requires an extended amount of time for the meat to cook thoroughly. In some known smokers, proper smoking techniques require that meat products be smoked for a day or more. This requires substantial preparation time and minding the heat and wood sources for proper temperature and oxygenation levels.

At least some known smokers include an electric fan or blower to channel air through the smoker and over the meat for the purpose of faster smoking. However, such blowers commonly include electrical controllers and batteries that may be prone to failure. Furthermore, at least some known smokers collect burned ash in the bottom of the smoker, and require a user to lean into the smoker and scoop the ash from the smoker for removal.

BRIEF DESCRIPTION OF THE INVENTION

In one aspect, a smoker assembly is provided. The smoker assembly includes a body portion comprising a body top end and a body bottom end. The body portion includes at least one air inlet vent defined therethrough proximate the body top end. The smoker assembly also includes at least one air inlet duct coupled to the body portion. The air inlet duct includes a first opening configured to align with the air inlet vent and a second opening configured to be positioned proximate the body portion bottom end.

In yet another aspect, a method of assembling a smoker assembly is provided. The method includes forming an air inlet vent through a body portion. The body portion includes a top end and a bottom end, and the air inlet vent being positioned proximate the top end. The method also includes coupling an air inlet duct to the body portion. The air inlet duct includes a first opening and a second opening, wherein coupling the air inlet duct comprises aligning the first opening with the air inlet vent and positioning the second opening proximate the bottom end of the body portion

DETAILED DESCRIPTION

Described herein is a smoker assembly including a body portion having a top end, a bottom end, and at least one air inlet vent defined therethrough proximate the top end. The smoker assembly also includes at least one air inlet duct coupled to the body portion. The air inlet duct includes a first opening configured to align with the air inlet vent and a second opening configured to be positioned proximate the body portion bottom end. The body portion also defines a chamber in which fuel is burned to cook the meat and create smoke within the chamber. The heated air rises within the chamber and creates a partial vacuum that draws additional air through the air inlet duct to replace the heated air. Because the first opening and the second opening are at opposing ends of the air inlet duct, the atmospheric air within the air inlet duct builds velocity and momentum and creates a downdraft within the air inlet duct that discharges the air within the chamber.

The down draft created by positioning the first opening at the top end, where the atmospheric air is cooler, and by positioning the second opening at the bottom end, where the air is heated, facilitates channeling a larger volume of air through the smoker assembly than if atmospheric air entered the smoker assembly through the bottom end of the body portion. The larger volume of heated air facilitates cooking the meat in less time and also causes more of the smoke to pass over the meat, thus increasing the quality of the smoke flavor. As such, the continual introduction of additional atmospheric air provides a continual supply of fresh, cooler, more oxidized, and more humid air, which imparts beneficial characteristics to the interior environment of the smoker to facilitate "hot and fast" smoking.

Figure 1:
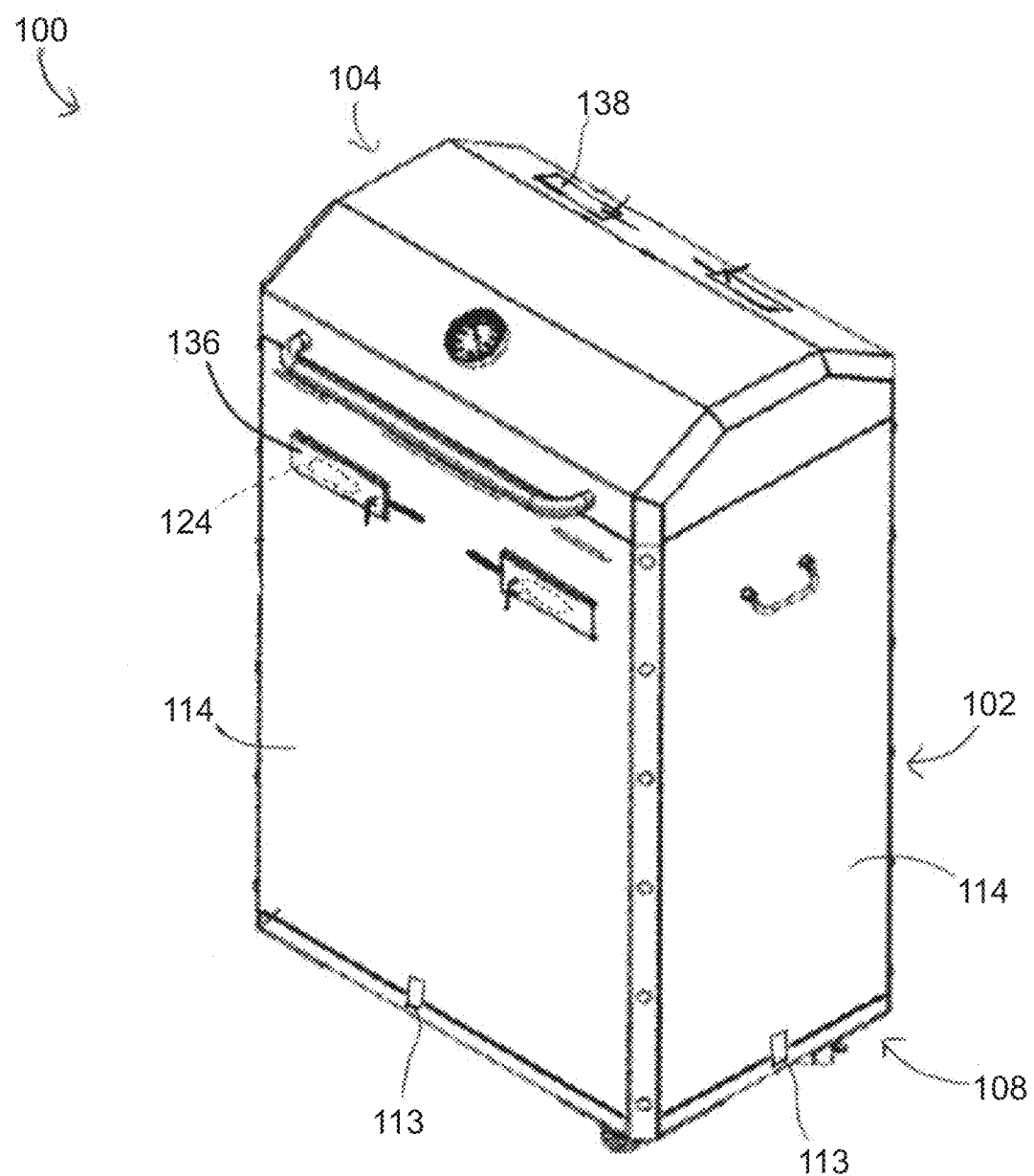
FIG. 1 is a perspective view of an exemplary smoker assembly.
Figure 2:
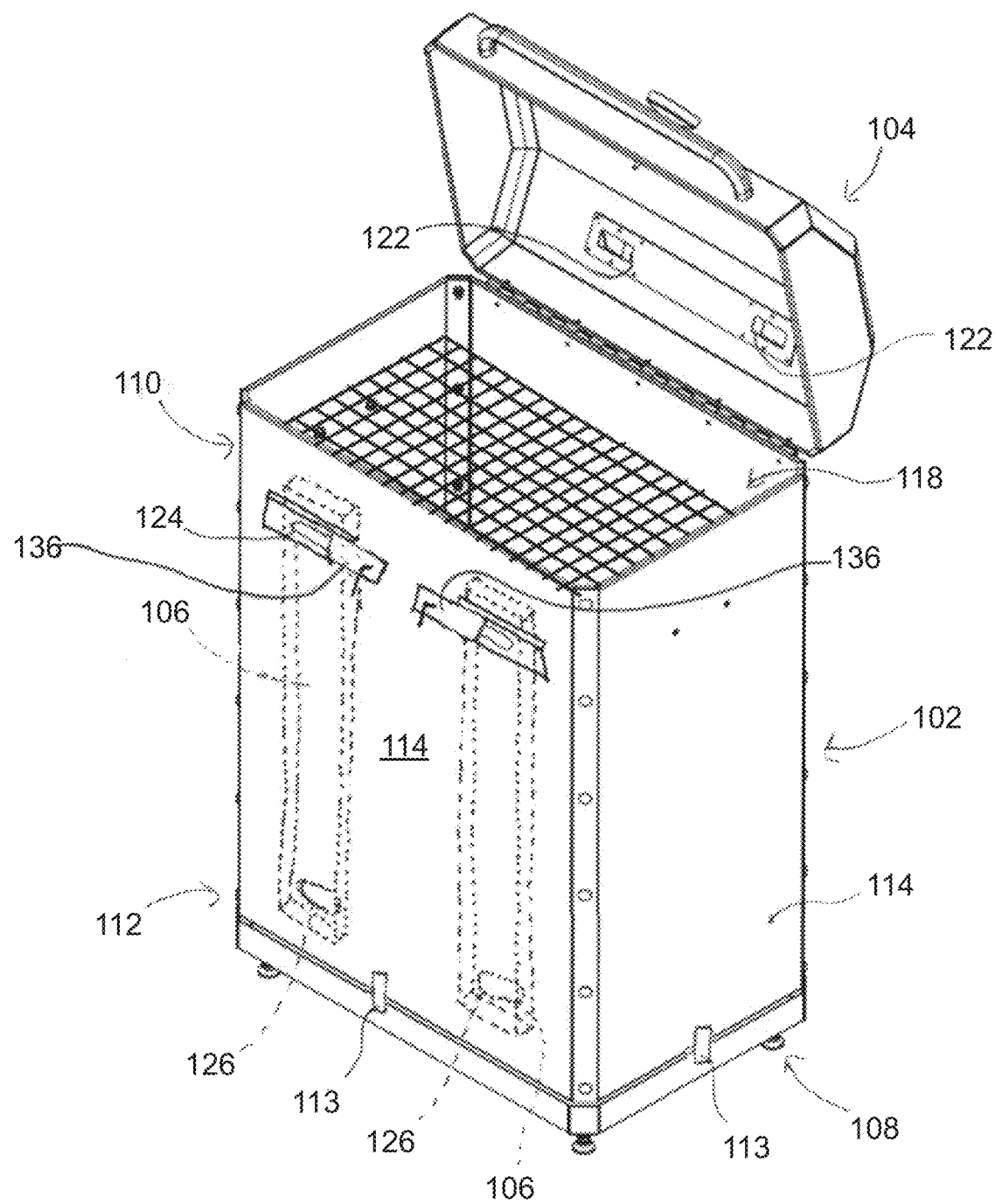
FIG. 2 is a perspective view of the smoker assembly shown in FIG. 1 illustrating a lid assembly in an open position.
Figure 3:
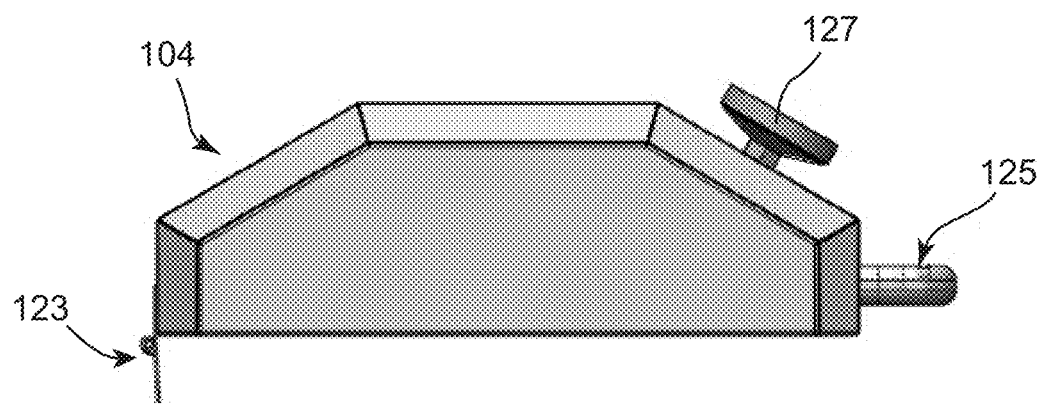
FIG. 3 is a side view of the lid assembly shown in FIG. 1.
Figure 4:
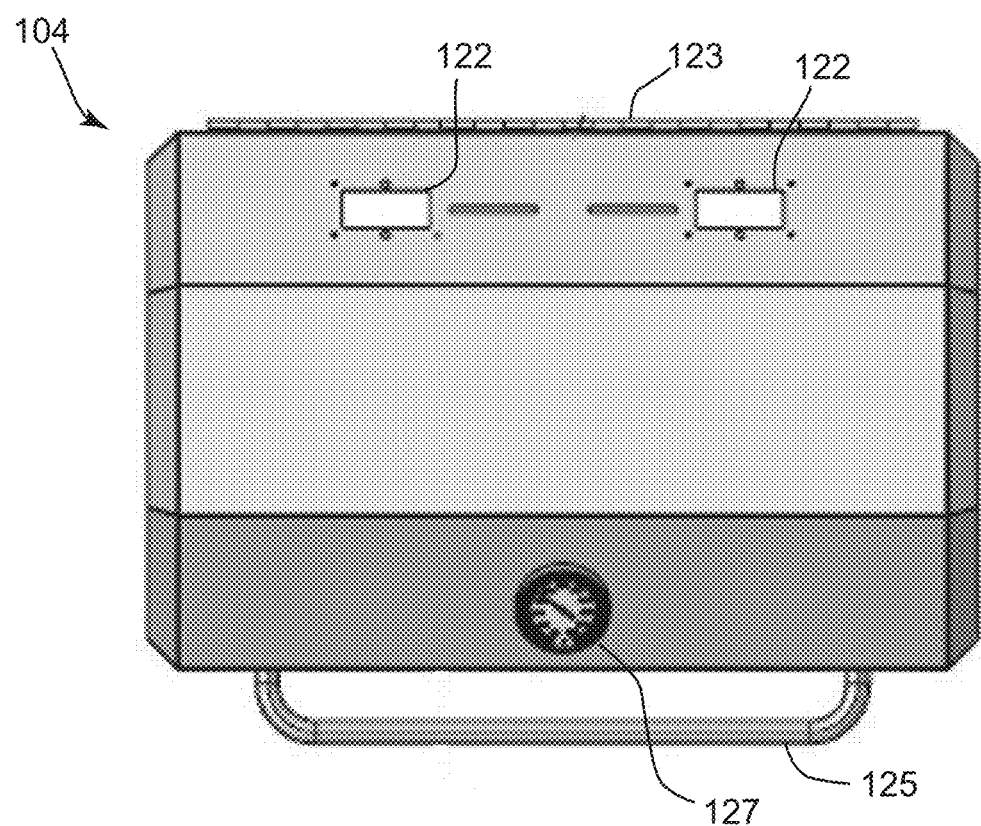
FIG. 4 is a top view of the lid assembly shown in FIG. 1.
Figure 5:
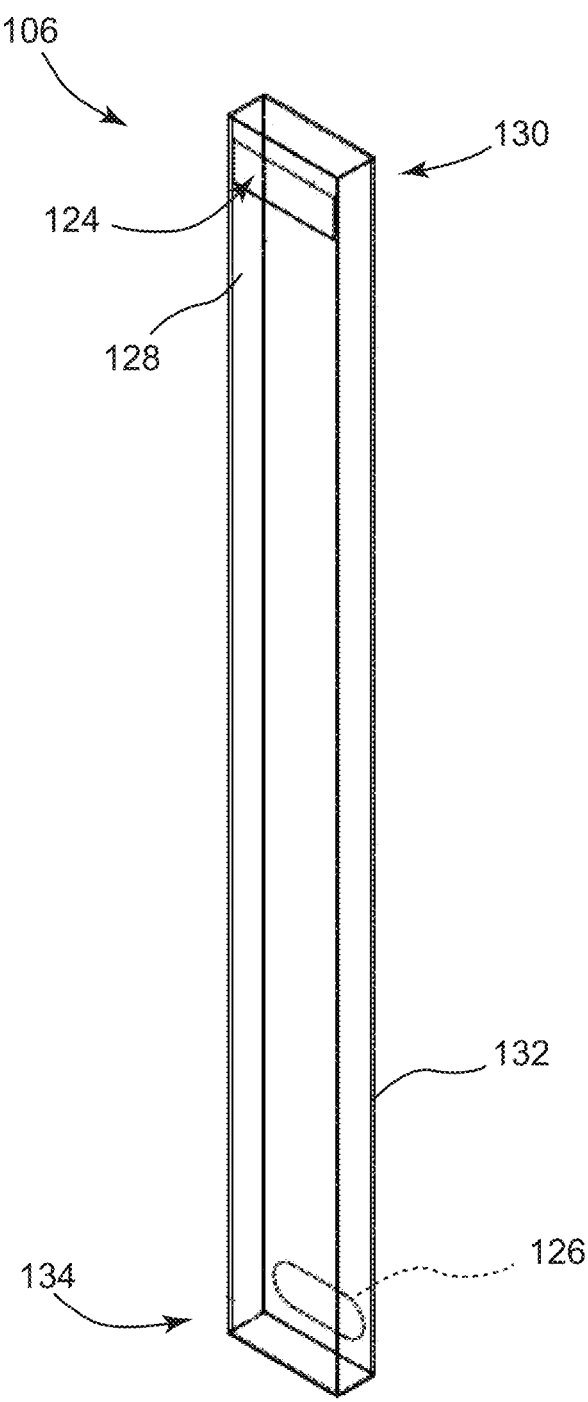
FIG. 5 is a perspective view of an air inlet duct for use with the smoker assembly shown in FIG. 1.
Figure 6:
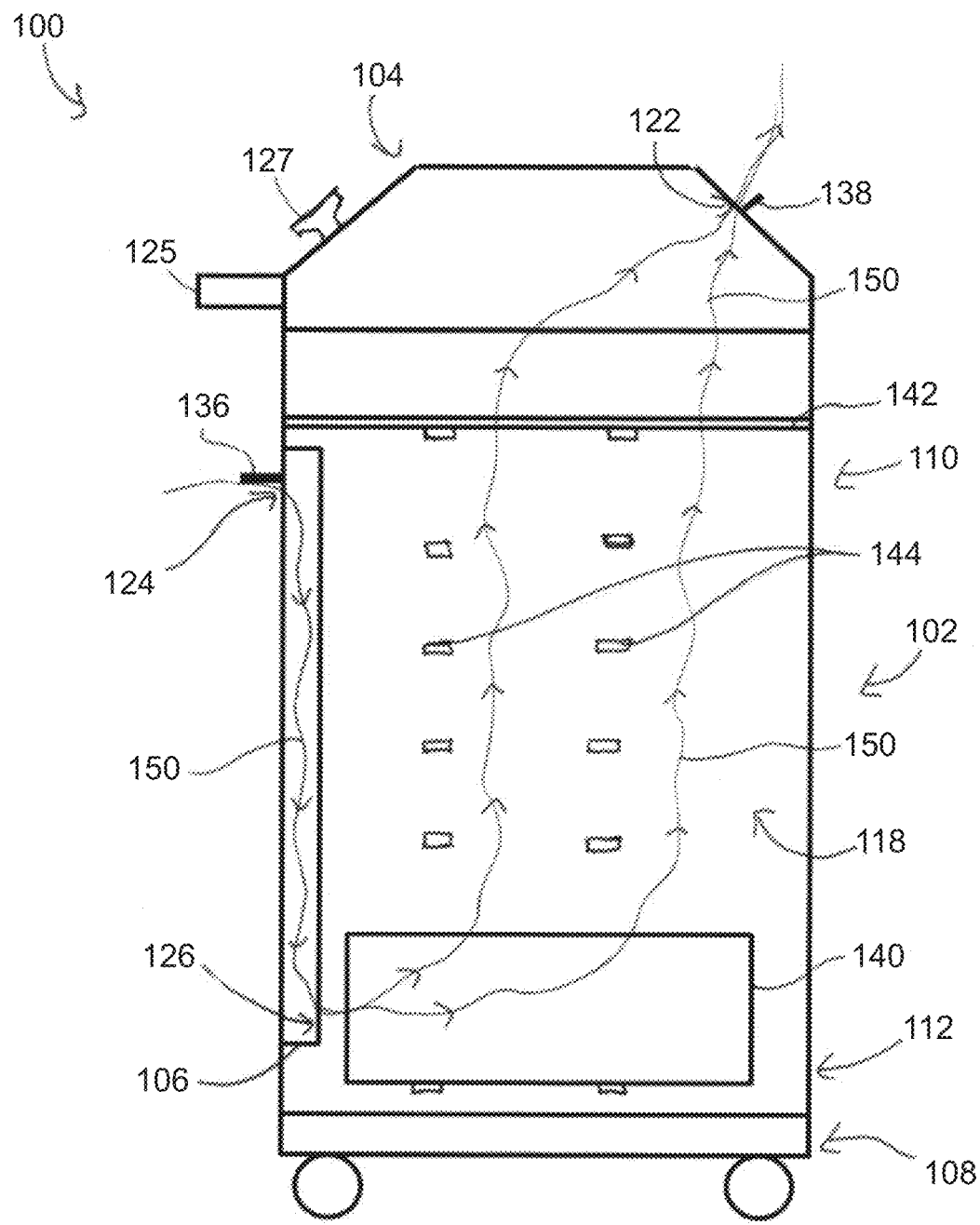
FIG. 6 is a cross-section view of the smoker assembly shown in FIG. 1.

FIG. 1 is a perspective view of an exemplary smoker assembly 100 having a body portion 102 and a lid assembly 104. FIG. 2 is a perspective view of smoker assembly 100 illustrating lid assembly 104 in an open position. FIG. 3 is a side view of lid assembly shown 104, and FIG. 4 is a top view of lid assembly 104. FIG. 5 is a perspective view of an air inlet duct 106 for use with smoker assembly 100. FIG. 6 is a cross-sectional view of smoker assembly 100.

As shown in the figures, smoker assembly 100 includes a body portion 102, a lid assembly 104, and a bottom assembly 108. Specifically, body portion 102 includes a top end 110 to which lid assembly 104 is pivotally coupled, and a bottom end 112, to which bottom assembly 108 is removably coupled. More specifically, bottom assembly 108 is removably coupled to body portion 102 by at least one latch 113 that enables body portion 102 to be removed from bottom assembly 108. Removal of body portion 102 allows a user to easily access bottom assembly to facilitate removal of ash or to load fuel container 140.

Body portion 102 further includes a plurality of walls 114 that combine with lid assembly 104 to form a chamber 118 configured to accommodate various meats to be smoked therein. At least one wall 114 of body portion 102 includes an air intake vent 120 defined therethrough and positioned proximate top end 110. Additionally, lid assembly 104 includes an exhaust vent 122 defined therethrough that enables heated air to escape chamber 118. Additionally, lid assembly 104 includes a hinge 123 pivotally coupled to body portion 102 and a handle 125 for operating lid assembly 104. Further, a temperature gauge 127 is coupled to lid assembly 104 for indicating the temperature of the portion of chamber 118 covered by lid assembly 104.

In the exemplary embodiment, smoker assembly 100 includes an air inlet duct 106 coupled to body portion 102. Air inlet duct 106 includes a first opening 124 configured to align with air inlet vent 120 in body portion 102, and also includes a second opening 126 positioned proximate bottom end 112 of body portion 102. More specifically, air inlet duct 106 is coupled to and extends along an inner surface of wall 114 such that air inlet duct 106 is positioned within chamber 118. In such a configuration, first opening 124 is formed in a front side 128 at a top end 130 of air inlet duct 106 and second opening 126 is formed in an opposing rear side 132 at a bottom end 134 of air inlet duct 106 such that second opening 126 is configured to discharge air from within air inlet duct 106 into chamber 118. As best shown in FIG. 6, top end 130 and first opening 124 of air inlet duct 106 are positioned near top end 110 of body portion 102 and bottom end 134 and second opening 126 of air inlet duct 106 are positioned near bottom end 112 of body portion 102.

Body portion 102 further includes a control mechanism 136 slidably coupled to wall 114 of body portion 102 proximate air inlet vent 120. In operation, control mechanism 136 is configured to slide along wall 114 of body portion 102 to selectively cover a portion of air inlet vent 120 to control airflow therethrough, as described herein.

Similarly, lid assembly 104 also includes a control mechanism 138 slidably coupled to lid assembly 104 proximate air exhaust vent 122. In operation, control mechanism 138 is configured to slide along lid assembly 104 to selectively cover a portion of air exhaust vent 122 to control airflow therethrough, as described herein. Air exhaust vents 122 allow heated air and smoke within chamber 118 to escape, allowing for temperature control and preventing excessive smoke build-up. Control mechanisms 138 cover portions of air exhaust vents 122 to enable a user to control the amount of heat and smoke allowed to flor through air exhaust vents 122. Alternatively, lid assembly 104 may include a hood positioned over air exhaust vents 122 rather than control mechanisms 138.

Referring now to FIG. 6, smoker assembly 100 also includes a fuel container 140 for holding fuel, such as wood or charcoal, which provides a heat source to smoker assembly 100. A support surface 142, such as a grill or grate, is also positioned within chamber 118 to support the meat being cooked. In the case of a grill or grate, the support surface 142 contains numerous holes to permit heated air from chamber 118 to pass through support surface 142. Body portion 102 further includes a plurality of support structures 144 extending into chamber 118 from walls 114 that are configured to support fuel container 140 and support surface 142. Support structures 144 are spaced between top end 110 and bottom end 112 of body portion 102 and are engaged by support surface 142 and/or fuel container 140 to position support surface 142 and/or fuel container 140 at a desired location within chamber 118 between top end 110 and bottom end 112 of body portion 102.

The meat may be placed on support surface 142 such as a grill or grate, or may be suspended or hung via hooks or other hanging means. A fuel, such as wood, charcoal, pellets, or any combination thereof, is loaded into fuel container 140 and positioned either on bottom assembly 108 or on support structures 144 before igniting the fuel to provide a heat source for smoker assembly 100 within chamber 118. As described herein, the fuel is burned to generate flavoring smoke that is directed past and around the meat to infuse and impart smoke flavor.

Grills and smokers usually include a vents or other pathway to direct atmospheric oxygen to the heat source to ensuring a flow of sufficient oxygen to fuel the fire. In the exemplary embodiment, smoker assembly 100 defines an airflow path 150 therethrough to facilitate smoking the meat within chamber 118. Air intake vents 120, first opening 124, air inlet duct 106, second opening 126, chamber 118, and exhaust vents 122 are all coupled in flow communication to form airflow path 150.

In operation, atmospheric air is channeled through air inlet vents 120 and first opening 124 into air inlet duct 106. The air will continue along path 150 within air inlet duct 106 and be discharged from air inlet duct 106 through second opening 126 at bottom end 134 and into chamber 118. In the exemplary embodiment, air inlet duct 106 is configured to cause atmospheric air to enter chamber 118 at or below the heat source in fuel container 140 at bottom end 112 of body portion 102. As the cooler atmospheric air exits second opening 126, it is heated and mixes with the smoke within chamber 118 before rising through chamber 118, passing the meat, and exiting smoker assembly 100 through air exhaust vents 122.

The heated air rises within chamber 118 and creates a partial vacuum that draws additional air through air inlet duct 106 to replace the heated air. Because the first opening 124 and the second opening 126 are at opposing ends 130 and 134 of air inlet duct 106, the atmospheric air within duct 106 builds velocity and momentum within inlet duct 106 and creates a downdraft within air inlet duct 106 that discharges the air within chamber 118. The down draft created by positioning the first opening 124 at top end 130 where the atmospheric air is cooler, and positioning the second opening 126 at bottom end 134 where the air is heated facilitates channeling a larger volume of air through smoker assembly 100 than if atmospheric air entered smoker assembly 100 at bottom end 112. The larger volume of heated air facilitates cooking the meat in less time and also causes more of the smoke to pass over the meat, thus increasing the quality of the smoke flavor.

Air inlet ducts 106 are coupled to the inner surface of body portion 102 and positioned within chamber 118 not only for easier storage and portability of smoker assembly 100, but also because positioning air inlet ducts 106 within chamber 118 results in beginning the heating process of atmospheric air within air inlet duct 106. More specifically, rear side 132 of air inlet duct 106 is exposed to the heated air within chamber 118 and so is warmer than if air inlet duct 106 were positioned exterior to chamber 118. When the air within air inlet duct 106 is already warmer when it is discharged through second opening 126 into chamber 118 than it was at inlet vent 120, it will heat up faster than if introduced into chamber 118 at atmospheric temperature. The faster the air reaches the desired temperature, as controlled by control mechanisms 136 and 138, the faster it will rise up through chamber 118, pass the meat, and exit chamber 118 through air exhaust vents 122. The less time that the air spends within chamber 118 along path 150, the more air that is required to be drawn through air inlet duct 106 and into chamber 118 to replace the escaping air. As described herein, a higher volume of air that follows path 150 through smoker assembly 100 results in a faster cook time and more smoke flavor in the meat.

As described herein, air inlet vents 120 and air exhaust vents 122 include control mechanisms 136 and 138, respectively, that can be manipulated to fully or partially block air inlet vents 120 and air exhaust vents 122, allowing control over the amount of atmospheric air entering chamber 118 and control over the amount of heated air and smoke leaving smoking chamber 118. Controlling the amount of air allows for controlling the temperature within chamber 118 and also prevents excessive smoke build-up. Because the hot escaping air from air exhaust vents 122 continues to rise in the cooler ambient atmosphere, it will not be drawn back into chamber 118 through air exhaust vents 122. Rather, cooler, relatively humid ambient air is drawn through air inlet duct 106 to replace the heated air in bottom end 112 of body portion.

In the exemplary embodiment, and without limitation to any specific theory or mode of operation, it is believed that the continual introduction of additional atmospheric air provides a continual supply of fresh, cooler, more oxidized, and more humid air, which imparts beneficial characteristics to the interior environment of the smoker to facilitate "hot and fast" smoking.

By way of example and not limitation, the heat source, typically a fire, consumes the oxygen within the smoker, and the resulting water vapor is almost immediately vented out of the top. It is believed that this produces a relatively dry interior environment compared to the ambient air. This movement of heated air and smoke also is believed to generate a pressure differential, which pulls in atmospheric air from other sources. In the depicted embodiment of FIG. 6, this includes atmospheric air drawn into the smoking chamber via the air inlet duct.

The introduction of cooler, more humid air may effectively moisturize the meat and reduce the amount of escaping water vapor, similar to the principle of sweating. In arid climates, the lower water content of the atmosphere means it can absorb more water from skin, causing sweat to evaporate rapidly, drawing with it heat energy from the skin. However, in humid environments, the air is saturated with water and cannot absorb more, so sweat does not evaporate.

Similarly, the airflow cycle described herein is believed to maintain a higher humidity level in the smoking chamber surrounding the meat, inhibiting moisture from evaporating out of the meat. The retention of the cooler water in turn is believed to inhibit heat accumulation in the outer layers of the meat, and to facilitate heat transfer to the center, allowing the entire slab to cook more evenly at higher temperatures.

Although specific features of various embodiments may be shown in some drawings and not in others, this is for convenience only. In accordance with the principles of the invention, any feature of a drawing may be referenced and/or claimed in combination with any feature of any other drawing.

When introducing elements/components/etc. of the systems and apparatus described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A smoker assembly comprising:
   a body portion comprising a top end, a bottom end, a lid assembly pivotally coupled to said top end of said body portion and a plurality of walls that define a chamber configured to accommodate meats to be smoked therein;
   at least one air inlet vent defined in a first wall of the plurality of walls proximate said top end;
   at least one air inlet duct extending along and coupled to an inner surface of said first wall, wherein said at least one air inlet duct comprises a first opening configured to align with said at least one air inlet vent and a second opening configured to be positioned proximate said bottom end; and,
   a fuel container disposed within said chamber wherein fuel is burned within said chamber to cook meats and create smoke within said chamber.

2. The smoker assembly in accordance with claim 1, wherein the second opening is configured to channel air into the chamber.

3. The smoker assembly in accordance with claim 1, wherein said body portion comprises at least one control mechanism slidably coupled to said body portion proximate the at least one air inlet vent, wherein said at least one control mechanism is configured to slide along said body portion to selectively cover a portion of at least one the air inlet vent to control an airflow therethrough.

4. The smoker assembly in accordance with claim 1, wherein said at least one air inlet duct comprises a front side and an opposing rear side, wherein the first opening is formed in said front side and the second opening is formed in said rear side.

5. The smoker assembly in accordance with claim 1, further comprising a bottom assembly removably coupled to said bottom end of said body portion.

6. The smoker assembly in accordance with claim 1, wherein said lid assembly comprises at least one exhaust vent defined therethrough.

7. The smoker assembly in accordance with claim 6, wherein said lid assembly comprises at least one control mechanism slidably coupled to said lid assembly proximate the at least one exhaust vent, wherein said at least one control mechanism is configured to slide along said lid assembly to selectively cover a portion of the at least one exhaust vent to control an airflow therethrough.

8. The smoker assembly in accordance with claim 1, wherein said at least one air inlet duct comprises a top end and a bottom end, said first opening positioned proximate said top end of said at least one air inlet duct and said second opening positioned proximate said bottom end, said second opening positioned at one of said fuel container and below said heat container, wherein atmospheric air is heated and mixed with said smoke within said chamber before rising through said chamber, wherein a down draft is created within said at least one air inlet duct that facilitates channeling of a larger volume of air through said smoker assembly.

9. The smoker assembly in accordance with claim 1, wherein said body portion comprises a plurality of support structures spaced between said top end and said bottom end, wherein said fuel container configured to engage at least one support structure to position said fuel container at a desired location along said body portion between said top end and said bottom end.

10. A method of assembling a smoker assembly, said method comprising:
    forming an air inlet vent through a body portion, wherein the body portion includes a top end, a bottom end and, a lid assembly pivotally coupled to said top end of said body portion and a plurality of walls that define a chamber configured to accommodate meats to be smoked therein, the air inlet vent being positioned proximate the top end, the air inlet vent defined in a first wall of said plurality of walls;
    coupling an air inlet duct to the body portion, the air inlet duct having a first opening and a second opening, wherein coupling the air inlet duct comprises aligning the first opening with the air inlet vent and positioning the second opening proximate the bottom end of the body portion; wherein the air inlet duct extends along and is coupled to an inner surface of said first wall; and,
    positioning a fuel container within said chamber wherein fuel is burned within said chamber to cook meats and create smoke within said chamber.

11. The method in accordance with claim 10, wherein coupling the air inlet duct to the body portion comprises coupling the air inlet duct to the body portion such that an airflow enters the air inlet vent, is channeled downward through the air inlet duct, and is discharged from the air inlet duct through the second opening into the chamber.

12. The method in accordance with claim 10, further comprising slidably coupling at least one control mechanism to the body portion proximate the air inlet vent, wherein the at least one control mechanism is configured to slide along the body portion to selectively cover a portion of the air inlet vent to control an airflow therethrough.

13. The method in accordance with claim 10, further comprising removably coupling a bottom assembly to the bottom end of the body portion.

14. The method in accordance with claim 10, further comprising pivotally coupling said lid assembly to said top end of said body portion, said lid assembly including at least one exhaust vent defined therethrough.

15. The method in accordance with claim 14, further comprising slidably coupling at least one control mechanism to the lid assembly proximate the exhaust vent, wherein the at least one control mechanism is configured to slide along the lid assembly to selectively cover a portion of the exhaust vent to control an airflow therethrough.

16. The method in accordance with claim 10, further comprising:
    coupling a plurality of support structures to the body portion and spaced between the top end and the bottom end; and
    engaging at least one support structure with the fuel container to position said fuel container at a desired location along said body portion between said top end and said bottom end.

* * * * *